Patented Feb. 19, 1935

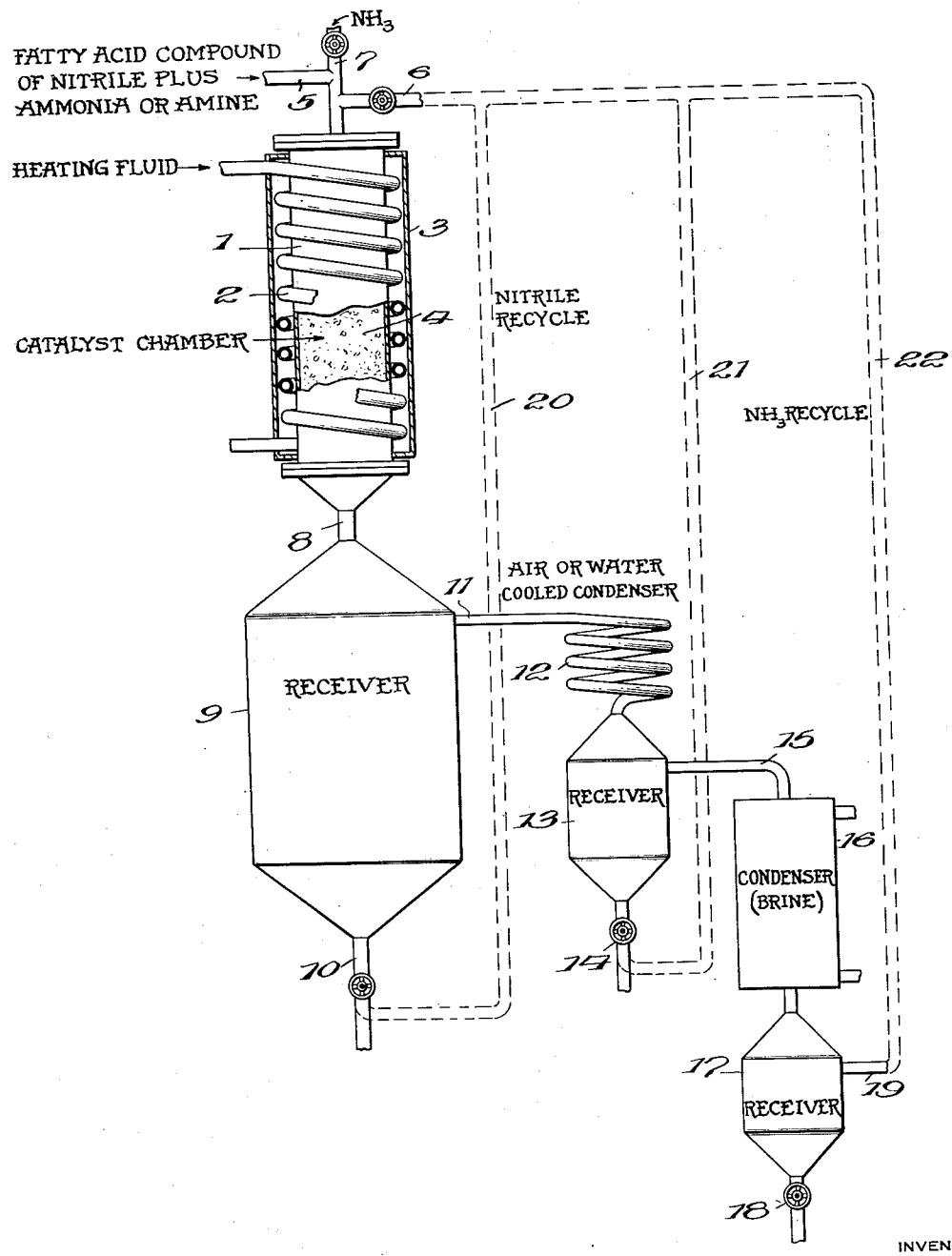

1,991,955

UNITED STATES PATENT OFFICE 1,991,955

PROCESS OF PYROLYTICALLY TREATING HIGHER FATTY ACID SUBSTANCES

Anderson W. Ralston, Chicago, Ill., assignor to Armour and Company, Chicago, Ill., a corporation of Illinois Application April 13, 1934, Serial No. 720,454

20 Claims. (Cl. 260—99.30)

This invention relates to processes of converting higher fatty acids and it comprises processes wherein a higher fatty acid, its esters, or nitriles of a higher fatty acid are catalytically decomposed in the presence of ammonia or an aliphatic amine to yield useful products.

A few processes have been described for making useful products from higher fatty acids, such as stearic, palmitic, lauric and the like. It has, for instance, been suggested to "crack" the fatty acids whereby aldehydes and various complex substances are formed in small amounts, these processes generally having for their object the manufacture of more valuable materials from the relatively cheap and abundant fatty acids. However, these prior processes possess numerous disadvantages. Very small amounts of useful products are formed. The decomposition, or cracking, is so drastic that large quantities of tars, polymerized products, gums, resins, etc. are produced none of which have any commercial value. Prior attempts have invariably resulted in the formation of polymerized products which poison the catalyst and render it useless. Moreover, the formation of coke has been a common experience and the coke likewise collects on the catalyst, choking it so that after a relatively short time the catalyst must be renewed and the apparatus cleaned of carbonized residues.

All of these prior attempts result in an actual decomposition or "cracking" of the long hydrocarbon chain structure of the fatty acid. This is advantageous because products of lower molecular weight having greater value and utility are obtained. But, as stated, no one has hitherto been able to control the extent of the cracking reaction. That is to say, the cracking hitherto practiced has always resulted in the formation of major quantities of undesirable by-products such as tars, pitches, polymerized products, and resins. Nevertheless a pyrolytic process which could be made to yield major quantities of desirable and useful products from the higher fatty acids is of economic significance in this art.

It is therefore an object of this invention to produce a process by which the cheap, abundant, higher fatty acids can be converted into products having a greater unit value than the fatty acid, and useful in many industrial relations.

I have discovered that the higher fatty acids, either as such or in the form of their esters, such as ethyl stearate, can be subjected to catalytic pyrolysis without the formation of undesirable tars, pitches, polymers, contamination of the catalyst, etc. provided the pyrolysis is conducted in the presence of ammonia or an alkyl amine. I have further discovered that such pyrolysis yields, and can be made to yield, nitrogen-containing organic compounds having large commercial value and useful in detergents, insecticides and in various other relations. I have also discovered that a higher fatty acid nitrile, if subjected to catalytic pyrolysis in the presence of ammonia or an alkyl amine will yield nitriles of lower molecular weight and generally unsaturated. In fact, in my process, when starting with a higher fatty acid or its esters, I believe that the higher fatty acid nitriles are first formed and these subsequently "crack" to give unsaturated nitriles of lower molecular weight, amines of various kinds, terpenes and other compounds, as will be more fully described.

In order to illustrate my process in detail and to simplify understanding, I have, on the attached sheet of drawing, shown a typical apparatus set-up useful in carrying out my process. The showing is intended to be diagrammatic.

Referring to the drawing, 1 is a reaction chamber or tube containing a catalytic material. This tube must be heated and I have shown a conventional set of heating coils surrounding the tube, these being indicated at 2. The whole is encased in a heat insulating cover 3. Reaction tube 1 is shown in broken section to reveal catalytic material 4 contained therein.

An inlet 5 conducts volatilized higher fatty acids or esters thereof to the catalyst tube. This inlet has a branch 6 for recycling reaction products as will be described. Inlet 7 may be used for the introduction of ammonia or an amine (vaporized) or, as described later on, both the fatty acid and the ammonia can be introduced through 5.

Outlet 8, at the bottom of the reaction tube conducts reaction products to receiver 9 provided with a draw-off outlet 10 and an outlet 11. Outlet 11 leads to an air or water-cooled condenser 12. Products condensed in 12 collect in receiver 13 also having a draw-off outlet 14 and outlet 15 leading to condenser 16. Condenser 16 is advantageously chilled by a brine solution and products condensed therein collect in receiver 17 having draw-off outlet 18 and vapor outlet 19.

Products collected in receivers 9 and 13 can be recycled back to the reaction tube by means of recycle lines 20 and 21 for purposes to be described. Uncondensed vapor leaving receiver 17 can be recycled back through line 22.

The arrangement of receivers 9, 13 and 17 together with condensers 12 and 16 constitutes a kind of fractionating device to roughly fractionate the products into three fractions according to boiling points. However, instead of using the arrangement shown I can, by inserting a condenser between outlet 8 and receiver 9 collect all the product in receiver 9 and fractionate it apart from the apparatus shown. This is done in ways well-known.

I shall first describe my process in detail as applied to the conversion of the alkyl esters of the higher fatty acids, this being the more usual raw material with which I start.

Among the esters which I can use are:

Methyl, ethyl, propyl, and butyl esters of stearic, palmitic, lauric, oleic, linoleic, and myristic acids.

Generally I use a mixture of such esters, the mixture being conveniently obtained from lard by saponifying the lard with sodium hydroxide, converting the sodium salts of the acids to free acid by treatment with hydrochloric acid, and then esterifying the acids with ethyl alcohol. Such a mixture of esters is advantageous because the source of the acids is cheap and abundant. And in the appended claims I mean the expression "alkyl esters of higher fatty acids" to include esters of this type; and by "higher fatty acids" I generically cover acids having six or more carbon atoms.

The ester to be used is first volatilized in any convenient way. The vapors are then conducted to the reaction chamber 1 wherein they contact with catalyst material 4. In addition to the volatilized ester, I also introduce free gaseous ammonia or a volatilized aliphatic amine. Advantageously the ester is volatilized in the usual type of distilling vessel and I find it more convenient to introduce the ammonia or amine directly into the still. This helps in volatilizing the ester but the ammonia or amine can be introduced separately, as through inlet 7 when desired.

The mixture of volatilized ester and ammonia (or amine) at atmospheric pressure, passes through catalyst material 4 which is heated to a high temperature. This temperature ranges from about 400° C. to 600° C. and is sufficiently high to "crack" the carbon chain of the ester. If the temperature is allowed to fall much below 400° C. cracking does not occur. My process is operated within the cracking temperature range. It is not concerned with the simple conversion of higher fatty acids, or their alkyl esters to corresponding nitriles. It is old for instance, to pyrolytically treat fatty acids in the presence of ammonia and a dehydrating catalyst at temperatures of about 350° C. But this yields products consisting almost wholly of nitriles of the acid treated. Stearic acid, for instance, yields stearonitrile. My process is to be distinguished from this prior practice in that I treat at higher temperatures. The temperatures I use, although probably giving nitriles of the corresponding fatty acids as intermediate products, actually lead to a cracking of the carbon chain and hence yield products differing greatly from the simple higher fatty acid nitriles.

Catalyst material 4 is a dehydrating catalyst. I find it best to use a catalyst composed of aluminum oxide baked on activated charcoal. I have found that oxides of the metals of the third, fourth and eighth group of the periodic system are effective. These include aluminum oxide, thorium oxide, cerium oxide, iron oxide and osmium oxide, and are classed as dehydrating catalysts. There are many ways of preparing them. Usually activated carbon is soaked in the nitrate of the metal, such as aluminum nitrate, dried, ignited and the nitrate decomposed in a stream of nitrogen.

I have stated above that in my process, while I succeed in cracking the higher fatty acid, I avoid the formation of undesirable products, such as tars, resins and polymers by conducting the pyrolysis in the presence of ammonia or an amine. I have discovered that both classes of substances act as "protective" materials to prevent polymerization, resin formation, carbonization, etc. In addition, they react with the fatty acid ester and thus yield organic nitrogen compounds. The protection afforded by the ammonia or amine is so great that no coke or polymerized material forms on the catalyst even after long continuous use. This indicates that the polymerization of the cracked hydrocarbon chains is effectively prevented by the ammonia or amine. Among the amines which I can use are alkyl amines, and this application is specifically directed to the use of these. Such alkyl amines which I have found suitable are ethyl, methyl, propyl, and butyl amine, and secondary amines such as dimethyl amine. It is desirable that the amino used contain a free hydrogen but as will be described, tertiary amines can be used. All of these substances are operative in my process and I broadly designate them as alkyl amines in the appended claims.

Thus, as illustrating my process, 300 parts of a mixture of the ethyl esters of lard fatty acids are passed, together with a stream of ammonia at atmospheric pressure over an aluminum oxide catalyst maintained at a temperature of 418° C. to 523° C. The product recovered amounts to 288 parts. Of this, about 213 parts will collect in receiver 9, 60 parts in receiver 13 and about 13 parts in receiver 17. Ethyl alcohol and water, collect as lower layer in 9 and can be withdrawn through outlet 10. Much of the product collected in 9 is high boiling, it boiling between 70° C. and 185° C. at 20 mm. and consists largely of the nitriles of the corresponding fatty acids, indicating incomplete cracking. This is conveniently recycled back through line 20 to the catalyst chamber. There are basic nitrogen compounds in this product and these can be extracted with dilute hydrochloric acid. That material collected in receiver 13 is very largely basic nitrogen compounds together with nitriles of lower molecular weight than the nitriles collected in receiver 9. Material collected in receiver 17 is of still lower boiling point and contains terpenes, unsaturated nitriles and basic nitrogen compounds. The character of these basic nitrogen compounds will be described presently. Since I find it best to use an excess of ammonia, any uncombined ammonia leaving the system can be recycled back to reaction chamber 1 by way of line 22.

In no instance can any ester be recovered as such. All of it is converted to nitrogen compounds and products of cracking.

Instead of using a mixture of fatty acid esters, I can start with an alkyl stearate such as ethyl stearate. For example, 5000 parts of ethyl stearate which boils at 170° C. at 5 mm. pressure, is volatilized and, at atmospheric pressure, passed over an aluminum oxide catalyst together with a stream of ammonia at an average rate of 44 parts of ester per hour. The temperature of the catalyst is maintained at about 500° C. and all the product is collected in a single receiver. It amounts to about 4500 parts, some of the starting material being lost by incomplete condensation.

I find that all oxygen in the ester is converted to alcohol and water, the amount of alcohol recovered being practically the quantitative yield to be expected from the alkyl radical of the ester. The alcohol separates out admixed with water and slight traces of aceto- and proprio-nitrile. It is desirable to work up the aqueous layer for the recovery of the alcohol since the alcohol can be used to esterify more stearic acid.

The remaining product is a light colored oil, free of any resins, tars, or polymers, thus indicating the protective properties of the ammonia. The oil contains basic nitrogen compounds and I isolate these by washing the oil with dilute hydrochloric acid. I find that these basic nitrogen compounds include various compounds such as hexamethylene diamine, pentamethylene diamine and various terpene amines such as pinylamine, fenchyl amine and carvakrylamine. These substances can be used as starting materials for the manufacture of drugs, pharmaceutical products, resins etc.

I then fractionate the residue from which the basic nitrogen compounds were extracted. This fractionation can be performed in any convenient way, for instance in an ordinary distilling apparatus, and advantageously under reduced pressure.

Fractionation gives me about twenty-five per cent of the non-basic product boiling at 30° C. to 155° C. at 5 mm., about fifty per cent boiling at 155° to 165° C. at 5 mm. and the remaining twenty-five per cent boiling at 165° to 185° C. at 5 mm. This first, or lower boiling fraction contains most of the valuable products I obtain. Refractionation of it yields unsaturated nitriles, useful in insecticides as noted above, and considerable quantities of terpene-like hydrocarbons. The higher boiling fractions, that is, the product boiling from 155° to 185° C. is largely stearonitrile and these higher boiling fractions are advantageously recycled. Thus, in a single pass through the cracking zone with a time of contact of about 5 seconds I obtain approximately a twenty-five per cent conversion of the ester to low boiling useful products, and nitrogen bases, the remainder being higher fatty acid nitriles, which can be recycled and cracked to further quantities of lower boiling products. But, in contract with prior proposals, I entirely avoid the formation of undesirable tars and polymers and avoid contamination of the catalyst by carbonized residues.

When using ethyl oleate as the starting material I find that similar products are obtained.

Thus, in my process I obtain as a result of the catalytic pyrolysis in the presence of ammonia quantities of nitrogen compounds identified as unsaturated nitriles, useful amounts of terpene-like hydrocarbons, and significant quantities of cyclic nitrogen compounds, terpene amines and various other organic nitrogen compounds not fully identified and probably consisting of mixtures of different amines. All of the fatty acid is converted to useful products, no tars, resins or polymers being formed.

Although I can, by appropriate fractionation, and purification, obtain separate chemical compounds in a state of purity, I do not find this necessary in the ordinary commercial utilization of products obtained in the present invention.

For instance, I can take the fraction containing the predominating quantity of unsaturated nitriles and dissolve it in an organic solvent such as kerosene or light oil. The mixture has excellent insecticidal properties. The terpenes associated with such nitriles need not be removed. In fact they contribute to the insecticidal action. If desired, the low-boiling unsaturated nitriles can be reduced with hydrogen to give amines, or hydrolyzed with water. Hence they are starting materials for a variety of products.

I believe that the course of the reactions occurring in my process are about as follows although I do not wish to be bound by the theories presented. Supposedly the ethyl stearate (for example) first reacts with the free ammonia to yield ethyl alcohol and stearamide. The latter then loses water to form stearonitrile and water. Under the temperature conditions of my process the stearonitrile then decomposes or "cracks" to yield nitriles of lower molecular weight, a large number of other nitrogen compounds, and terpene-like hydrocarbons. The actual chemistry of this part of the reaction is wholly obscure. I am therefore obliged to content myself with noting the observable facts. It is clear however, that the large quantity of ester passed through the catalyst is decomposed to compounds of lower molecular weight although their melocular configuration may be quite complex. That which is not so decomposed is converted to stearonitrile thus indicating complete conversion of the ester itself. In the absence of the protective ammonia or amine the low boiling, or cracked products formed would tend to polymerize to substances boiling a great deal higher than the original starting material. Many of the products formed are highly unsaturated and hence markedly reactive. This possibly accounts for the polymers obtained hitherto. But, as stated, in my process I avoid this polymerization by utilizing the protective action of ammonia or amines.

Instead of starting with an ester, I can start with a fatty acid nitrile. Thus I can volatilize and introduce stearonitrile and ammonia into contact with the catalyst, maintaining the latter at 400° C. to 600° C. This gives me large quantities of unsaturated nitriles, terpene-like hydrocarbons and complex basic nitrogen compounds.

As an example of this, I pass 189 parts of stearonitrile through the catalyst together with a stream of ammonia, the temperature being about 500° C. The product condensed will amount to 154 parts, representing a yield of 81 percent. The loss I attribute to the formation of exceedingly low boiling products not readily condensed. The condensate contains 3 parts of basic nitrogen compounds, extractable with dilute hydrochloric acid. The non-basic portion of the condensate gives me, on fractional distillation, about 30 parts boiling between 28° C. and 135° C., about 18-19 parts boiling at 135° C. to 160° C. and about 34 parts boiling at 160° C. to 175° C. Material boiling over this temperature amounts to 39 parts and is mostly unchanged stearonitrile. All boiling points given above are at 2 mm. pressure.

The unchanged stearonitrile of the above example is advantageously returned to the catalyst along with further quantities of ammonia. It will be noted that in this example I obtain a conversion of about 72 percent. The non-basic fractions other than stearonitrile contain considerable quantities of low boiling nitriles, generally unsaturated, some terpene-like hydrocarbons, and cyclic nitrogen compounds.

I have stated above that alkyl amines can be used instead of, or in admixture with ammonia.

As an example of this, 200 parts of ethyl stearate admixed with 79 parts of normal butyl amine are volatilized and passed over the aluminum oxide catalyst at 500° C. The condensed products amount to 182 parts containing 34 parts of basic nitrogen compounds and 118 parts of non-basic compounds. None of the original ethyl stearate can be recovered as such and all of the amine reacts. Fractional distillation of the non-basic fraction yields considerable quantities of unsaturated nitriles, terpenes, and other low-boiling products. This example shows that the quantity of basic compounds obtained can be increased when alkyl amines rather than ammonia are used.

Instead of using a primary amine, I can use a secondary amine. For example, 200 parts of ethyl stearate are mixed with 139 parts of di-normal-butyl-amine and the mixture volatilized and contacted with the catalyst at 500° C. Condensed products amount to 256 parts of which about 82 parts are basic nitrogen compounds. About half of the basic nitrogen compounds is unreacted butyl amine. The non-basic products, when fractionated give compounds similar to those obtained in the preceding example.

In like manner, other primary and secondary alkyl amines can be used both to protect the cracked products from polymerizing and to form nitrogen compounds. Methyl, ethyl and propyl amines, both primary and secondary give good results. Also mixed secondary amines such as methyl ethyl can be used. I find that best results are obtained when the amine used contains a free hydrogen atom but I do not wish to exclude tertiary amines since these are operative to some extent. When using tri normal butyl amine, for instance, I obtain both basic and non-basic products, the non-basic fractions containing ketonic compounds and non-basic nitrogen products. These are useful, even after rough separation into two or three fractions, as solvents. However, the protective action of tertiary amines is not as complete as that of ammonia or primary and secondary amines. Whereas the latter totally inhibit the formation of polymers, the tertiary amines do permit the formation of small quantities of high boiling gum-like polymers.

I can also use the higher fatty acids themselves as starting materials. For example, I pass 500 parts of volatilized stearic acid together with a stream of ammonia over the aluminum oxide catalyst at 500° C. The product condensed amounts to 447 parts containing both basic and non-basic nitrogen compounds. Fractionation of the non-basic fraction gives large quantities of low-boiling nitriles, terpene-like hydrocarbons and cyclic nitrogen compounds.

Oleic acid, and mixtures of lard fatty acids give like results. The higher fatty acids can also be used with the alkyl amines noted above. For example, I mix 182 parts of stearic acid with 79 parts of normal butyl amine or 139 parts of di-normal-butyl-amine, volatilize the mixture and pass it over the catalyst at 500° C. High yields of condensed products are obtained from which basic and non-basic fractions can be recovered.

Instead of starting with the simple alkyl esters of the higher fatty acids, I can volatilize higher fatty acid esters of the polyhydroxy alcohols and pass them, together with ammonia or an amine, over the catalyst. In one commercial adaptation of my invention I begin with lard itself since lard is cheap and abundant. It contains mixed triglycerides and, when subjected to the cracking process of my invention, gives me satisfactory yields of basic and non-basic nitrogen containing compounds as well as terpene-like hydrocarbons.

While I have generally indicated that a number of different compounds are obtained in my process, it is not to be understood that this lessens the utility of my invention. As noted above, I have found that the mixture of unsaturated nitriles obtained constitutes an effective insecticide. The terpene-like compounds obtained have a most pleasing perfume like odor and can be used in perfumes. They are also excellent solvents and need not be isolated into products of definite boiling point in order to find utility as solvents. The mixtures of amines obtained can be used as such in making detergents of the amine type, as wetting out agents, in the manufacture of synthetic resins, pharmaceuticals and the like.

Although I have, in the foregoing specific examples, referred particularly to the use of an aluminum oxide catalyst, it is to be understood that equally satisfactory results are obtained when other dehydrating metal oxide catalysts are used. Thus, instead of aluminum oxide I can use oxides of thorium, cerium, osmium and iron, these being representative metal oxide catalysts of the metals of the third, fourth and eighth group. They are all known dehydrating catalysts and have been used hitherto in pyrolytic processes wherein dehydrating action is necessary. I generically define them as dehydrating catalysts in the appended claims.

Having thus described my invention, what I claim is:

1. In the process of pyrolytically treating higher fatty acid substances chosen from the group consisting of higher fatty acids, their esters and nitriles to form useful products, the step which comprises subjecting such substances to catalytic treatment at a cracking temperature in the presence of a solid dehydrating catalyst and a volatilized nitrogen compound chosen from the class consisting of ammonia and its alkyl derivatives.

2. The process as in claim 1 wherein the temperature is 400° C. to about 600° C.

3. The process of converting higher fatty acids to useful products which comprises subjecting the higher fatty acid to catalytic conversion at a cracking temperature in the presence of a solid dehydrating catalyst and a volatilized nitrogen compound chosen from the class consisting of ammonia and its alkyl derivatives.

4. The process as in claim 3 wherein the temperature is 400° to about 600° C.

5. The process of converting higher fatty acids to useful products which comprises subjecting an ester of the higher fatty acid to catalytic conversion at a cracking temperature in the presence of a solid dehydrating catalyst and a volatilized nitrogen compound chosen from the class consisting of ammonia and its alkyl derivatives.

6. The process as in claim 5 wherein the temperture is 400° C. to about 600° C.

7. The process of preparing useful products from higher fatty acids which comprises volatilizing an alkyl ester of the higher fatty acid, admixing the volatilized ester with a nitrogen compound chosen from the group consisting of ammonia and its alkyl derivatives, passing the mixture into contact with a dehydrating metal oxide catalyst maintained at a cracking temperature, and condensing reaction products.

8. The process as in claim 7 wherein the temperature is 400° C. to about 600° C.

9. The process of preparing useful products from higher fatty acids which comprises volatilizing lard, admixing the volatilized lard with ammonia, passing the mixture into contact with a solid dehydrating catalyst maintained at a cracking temperature and condensing reaction products.

10. The process of cracking higher fatty acids to produce useful products therefrom which includes cracking catalytically in the presence of a nitrogen compound chosen from the group consisting of ammonia and its primary and secondary alkyl derivatives whereby the formation of tars and polymerized products is prevented.

11. In the process of cracking higher fatty acid substances chosen from the group consisting of higher fatty acids, their esters and nitriles to form useful products, the steps which comprise catalytically cracking such substances in the presence of a nitrogen compound chosen from the class consisting of ammonia and its alkyl derivatives to form low-boiling nitriles, unsaturated nitriles, amines, and terpene-like compounds, and fractionating the reaction product.

12. The process of cracking higher fatty acids which comprises subjecting the higher fatty acid to the action of a solid dehydrating catalyst at a temperature of at least 400° C. in the presence of ammonia.

13. The process of cracking higher fatty acids which comprises subjecting an ester of a higher fatty acid to the action of a solid dehydrating catalyst at a temperature of at least 400° C. in the presence of ammonia.

14. The process of cracking higher fatty acids which comprises subjecting an alkyl ester of a higher fatty acid to the action of a solid dehydrating catalyst at a temperature of at least 400° C. in the presence of ammonia.

15. The process of cracking higher fatty acids which comprises subjecting a higher fatty acid ester of a polyhydroxy alcohol to the action of a solid dehydrating catalyst at a temperature of at least 400° C. in the presence of ammonia.

16. The process of making useful products from higher fatty acids which comprises volatilizing ethyl stearate, admixing the volatilized stearate with ammonia, and subjecting the mixture to the action of a solid dehydrating catalyst at a temperature of at least 400° C.

17. The process as in claim 16 wherein the catalyst is aluminum oxide.

18. In the process of pyrolytically treating higher fatty acid substances chosen from the group consisting of higher fatty acids, their esters and nitriles to form useful products, the steps which comprise subjecting such substances to catalytic treatment in a cracking zone at a cracking temperature in the presence of a solid dehydrating catalyst and a volatilized nitrogen compound chosen from the class consisting of ammonia and its alkyl derivatives, and recycling unreacted higher fatty acid nitriles to the cracking zone.

19. The process as in claim 18 wherein the cracking temperature is at least 400° C.

20. The process as in claim 18 wherein the cracking temperature is at least 400° C. and the catalyst is aluminum oxide.

ANDERSON W. RALSTON.